Sept. 9, 1924. 1,508,363
R. N. CONWELL
ELECTRICAL METHOD AND APPARATUS
Filed May 11, 1921  2 Sheets-Sheet 2

INVENTOR
Rollin N. Conwell,
BY
Delos G. Haynes,
ATTORNEY

Patented Sept. 9, 1924.

1,508,363

UNITED STATES PATENT OFFICE.

ROLLIN N. CONWELL, OF BLOOMFIELD, NEW JERSEY.

ELECTRICAL METHOD AND APPARATUS.

Application filed May 11, 1921. Serial No. 468,588.

*To all whom it may concern:*

Be it known that I, ROLLIN N. CONWELL, a citizen of the United States, and a resident of Bloomfield, county of Essex, State of New Jersey, have invented an Improvement in Electrical Methods and Apparatus, of which the following is a specification.

This invention relates to electrical methods and apparatus, and with regard to certain more specific features, to methods and apparatus for use in connection with alternating currents.

Among the several objects of the invention may be noted the provision of inexpensive and durable electrical apparatus for effecting the various results hereinafter indicated, utilizing inductive action; and the provision of simple and reliable methods of attaining such results. Other objects will be in part obvious and in part pointed out hereinafter.

The invention accordingly comprises the features of construction, steps and sequence of steps, combinations of elements and arrangements of parts, which are exemplified in the description hereinafter in connection with the accompanying drawings, and the scope of the application of which will be indicated in the following claims.

In the accompanying drawings, in which is illustrated diagrammatically one of various possible embodiments of the invention, Fig. 1 is an elevation of one form of apparatus;

Similar reference characters indicate corresponding parts throughout the several views of the drawings.

Figure 1:
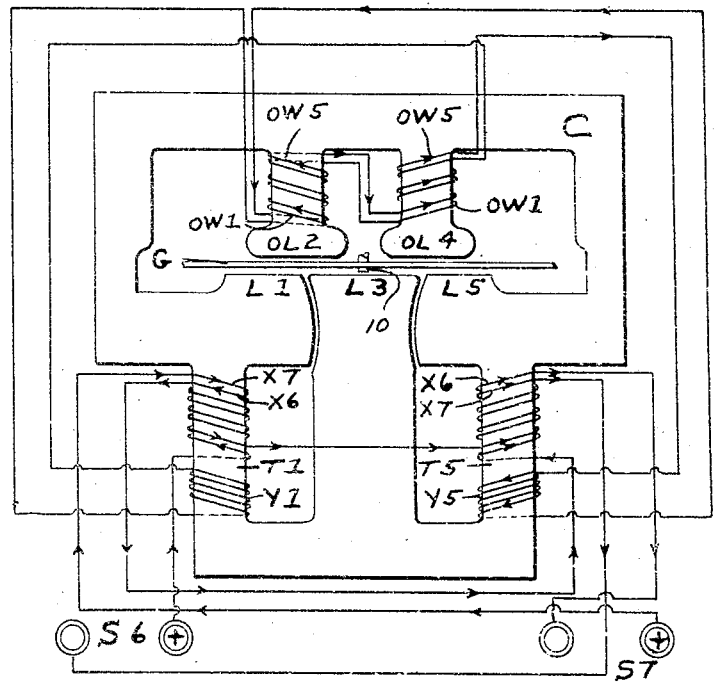

Fig. 1.—Construction.

Referring now more particularly to Fig. 1, there are illustrated at $S^6$, $S^7$, two sources of alternating current, which may be derived from one or more circuits; two induction devices such as transformers $T^1$, $T^5$; a primary winding $X^6$ for each transformer, connected to source $S^6$; a primary winding $X^7$ for each transformer, connected to source $S^7$; the primaries on transformer $T^1$ normally opposing one another, and the primaries on transformer $T^5$ normally aiding one another; pole pieces or core elements $L^1$ and $L^5$ are provided for each of said respective transformers; and secondary windings $Y^1$ and $Y^5$ for each of said respective transformers.

The transformer fluxes are due to the magneto-motive forces of the ampere turns of the primary and secondary windings of the respective transformers.

Another flux is induced by current passing through two other windings $OW^1$, $OW^5$ connected to the respective secondary windings $Y^1$, $Y^5$ of the transformers. These two other windings are each wound upon two legs $OL^2$ and $OL^4$ in such manner that their magneto-motive forces normally oppose one another. The net flux, if other than zero, cooperates with the transformer fluxes. These several fluxes induce electric currents in one or more conductors, for some useful purpose. In the present embodiment of the invention (see Figs. 1 and 3) the conductor is a movable element, to wit, a disc G pivoted as at 10 to one side of the plane of the laminated core C. The disc is driven by the vectorial sum of the forces acting upon it, that is, the resultant force arising from the reaction of the resultant flux and the flux caused by the electric currents induced thereby in the driven element G. The driven element G may simply allow an observer to determine its position and/or direction of movement, as in synchronizers. Or the driven element may deliver mechanical power for power purposes, or run a totalizer or operate a pointer or recording device (stylus or the like) or contacts or the like.

In the present instance the apparatus is illustrated as a relay, and the disc G normally tends to rotate in one direction. Upon a departure from normal condition, the disc tends to rotate in the opposite direction. The torque causing the rotation may be used for any of the several purposes above named, for which such torque may be suitable.

Normal condition.

In tracing the several currents and fluxes during normal condition, assume the two sources of power $S^6$, $S^7$ to be in phase, and the ampere turns in the two primaries equal, and assume an instant when the right-hand conductor at each source of power is plus, as indicated in Fig. 1. At this time, the several currents flow in the directions indicated by the arrows in Fig. 1. The proportioning of the windings and other factors is preferably such that this opposite flow of currents in primaries $S^6$ and $S^7$ in transformer $T^1$ produces zero flux therein and hence zero current in secondary $Y^1$ and in the other winding $OW^1$ connected thereto.

(A) Assume the instant when the right-hand conductor at each source of power is plus. The leg $L^5$ at the portion adjacent the disc G is zero. The leg $L^3$ is of opposite polarity and is also zero. The flux due to winding $OW^5$ in this instance lags the transformer flux. The extent of lag, for the purpose of the analysis hereinafter, may be considered as nominally ninety degrees. The upper legs $OL^2$, $OL^4$ are thus plus and minus, respectively. At this instant, then, the four legs $OL^2$, $L^3$, $OL^4$, $L^5$ are respectively plus, zero, minus, zero.

(B) Assume now an instant one-quarter cycle later. The two terminals at each source of power are now of zero potential, producing zero current in each primary; there is thus plus polarity at leg $L^5$ and minus at leg $L^3$. Since the other flux lags the transformer flux ninety degrees, said other flux is now zero at the legs $OL^2$ and $OL^4$. At this instant, then, the legs are respectively zero, minus, zero, plus, which means that the plus polarity has left the leg $OL^2$ and has appeared at the leg $L^5$.

(C) Assume now an instant another one-quarter cycle later. The right-hand terminal at each source of power is now minus, and the several currents and fluxes are thus one-half cycle behind their directions and values at the initial instant, indicated in paragraph A above. The legs are thus now respectively minus, zero, plus, zero, which means that the plus polarity has traveled from leg $L^5$ to leg $OL^4$.

(D) Assume now an instant another one-quarter cycle later, that is, three-quarters of a cycle later than the condition in paragraph A. The two terminals at each source of power are now of zero potential and the several currents and fluxes are one-half cycle behind their directions and values at the instant indicated in paragraph B above. The legs are thus now respectively zero, plus, zero, minus, which means that the plus polarity has traveled from leg $OL^4$ to leg $L^3$.

(E) Assume now an instant another one-quarter cycle later, that is, an entire cycle later than the condition in paragraph A. The legs are now of the same polarity as at the instant in paragraph A, namely, respectively plus, zero, minus, zero, which means that the plus polarity has traveled from leg $L^3$ to leg $OL^2$.

Figure 3:
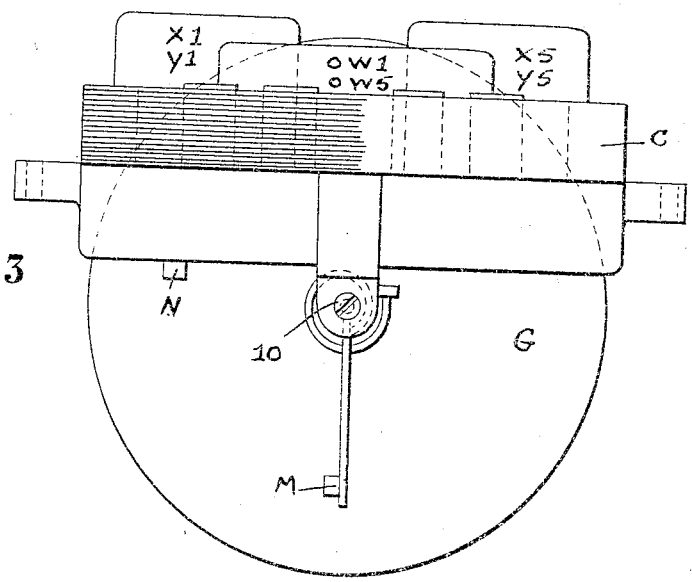
Fig. 3 is a plan of the parts shown in Fig. 1, excluding the connections.

The traveling field thus produced causes electric currents in the disc G, and the reaction between said flux or field and the flux caused by said currents produces torque in the disc, tending to move the disc counterclockwise (Figure 3).

Figure 2:
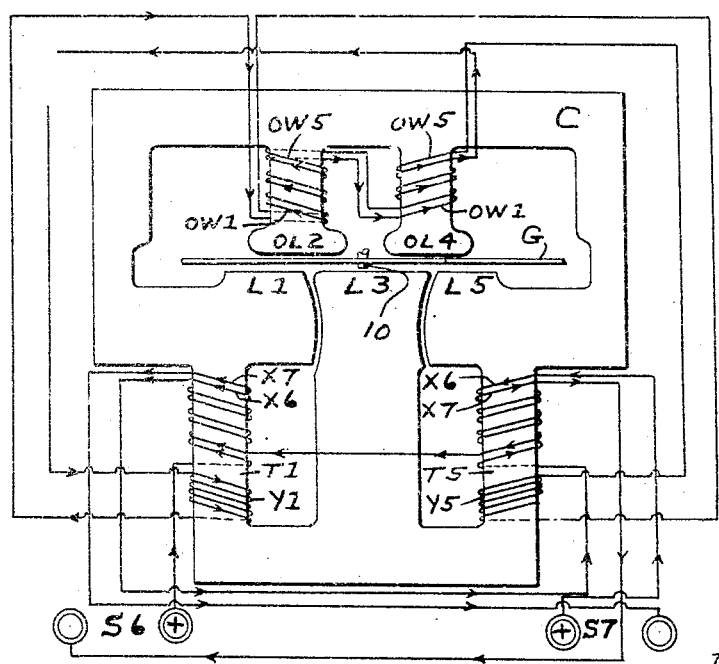
Fig. 2 is a similar view under different circuit conditions.

*Figure 2.—Abnormal condition, caused by reversal of current at one source.*

Next may be traced the several currents and fluxes when the departure from normal condition is caused by the current at the source $S^7$, for example, reversing with respect to the corresponding instantaneous values of the current at source $S^6$.

The primaries of transformer $T^1$ now aid one another, and the primaries of transformer $T^5$ now oppose one another. Assuming equal magnitude of currents at the two sources, there is now zero flux due to transformer $T^5$, and zero flux due to winding $OW^5$. The winding $OW^1$ is energized. The currents flow in the several directions indicated by the arrows in Fig. 2, at the instant when the right-hand conductor at source $S^6$ is plus and the left-hand conductor at source $S^7$ is also plus.

(A) Assume first this instant when the adjacent conductors of the two sources are plus. The leg $L^1$ at the portion adjacent the disc G is now zero. The leg $L^3$ is of opposite polarity and is also zero. The flux due to winding $OW^1$ in this instance leads the transformer flux. The extent of lead, for the purpose of this analysis, may be considered as nominally ninety degrees; for brevity the term quadrature is used herein as indicating any out-of-phase relationship (not necessarily ninety degrees) that will effect the respective action specified. At the instant in question, the leg $OL^2$ is plus and the leg $OL^4$ is minus. At this instant, then, the four legs $L^1$, $OL^2$, $L^3$, $OL^4$ are respectively zero, plus, zero, minus.

(B) Assume now an instant one-quarter cycle later. The two terminals at each source of power are now of zero potential, producing zero current in each primary; there is thus minus polarity at leg $L^1$, so far as the transformer flux therein is concerned. Since the other flux leads the transformer flux by ninety degrees, said other flux is now zero at leg $OL^2$ and $OL^4$. At this instant then, the legs are respectively minus, zero, plus, zero, which means that the plus polarity has traveled from leg $OL^2$ to leg $L^3$, or in an opposite direction to its direction of travel during the corresponding quarter-cycle A—B during abnormal condition I.

(C) Assume now an instant another one-quarter cycle later. The outer terminal at each source of power is now plus, and the several currents and fluxes are thus one-half cycle behind their directions and values at the initial instant A. The legs are thus now respectively zero, minus, zero, plus, which means that the plus polarity has traveled from leg $L^3$ to leg $OL^4$.

(D) Assume now an instant another one-quarter cycle later, that is, three-quarters of a cycle later than the condition in paragraph A. The two terminals at each source of power are now of zero potential and the several currents and fluxes are one-half cycle behind their directions and values at the instant indicated in paragraph B above. The legs are thus now respectively plus, zero, minus, zero, which means that the plus polarity has left the leg OL⁴ and has reappeared at the leg L¹.

(E) Assume now an instant another one-quarter cycle later, that is, an entire cycle later than the condition in paragraph A. The legs are now of the same polarity as at the instant in paragraph A, namely, respectively zero, plus, zero, minus, which means that the plus polarity has traveled from leg L¹ to leg OL².

The disc thus tends to travel in a clockwise direction (Fig. 3).

Résumé.

Thus a similarity in direction of instantaneous current values at the two sources (normal condition) causes travel of plus polarity and hence torque in one direction, while opposite direction of such instantaneous current values (abnormal condition) causes travel of plus polarity and hence torque in the opposite direction.

The apparatus is thus simple in construction, sensitive to reversal of relative instantaneous current values and is yet rugged enough to endure severe service conditions.

In general.

If the two sources of power of the relay are of unequal magnitude, or out of phase by an acute angle, the relay still does not reverse.

The above also applies to embodiments of the invention in apparatus other than relays, that is, an unequal magnitude or acute angle phase relation of the currents at the two sources does not reverse the resultant induced currents.

From the above it will be seen that the several objects of the invention are attained and other advantageous results achieved.

As many modifications of the embodiment above illustrated might be made without departing from the spirit or scope of the present invention, it is intended that the above description and accompanying drawings and claims shall be interpreted as illustrative and not in a limiting sense.

I claim:

1. In apparatus of the class described, in combination, transformers each having two primary windings adapted to be connected respectively to two sources of power, coacting windings connected to the respective secondaries of the said transformers and adapted to produce fluxes substantially in quadrature with the transformer fluxes, the primary windings on one transformer normally aiding and the primary windings on the other transformer normally opposing one another; and means for combining the several fluxes to form a traveling field.

2. In apparatus of the class described, in combination, transformers each having two primary windings adapted to be connected respectively to two sources of power, coacting windings connected to the respective secondaries of the said transformers and adapted to produce fluxes substantially in quadrature with the transformer fluxes, the primary windings on one transformer normally aiding and the primary windings on the other transformer normally opposing one another; and means for combining the several fluxes to form a traveling field; the direction of travel of the traveling field being dependent upon the phase relationship of the currents in said sources.

3. In apparatus of the class described, in combination, transformers each having two primary windings adapted to be connected respectively to two sources of power, coacting windings connected to the respective secondaries of the said transformers and adapted to produce fluxes substantially in quadrature with the transformer fluxes, the primary windings on one transformer normally aiding and the primary windings on the other transformer normally opposing one another; means for combining the several fluxes to form a traveling field; and means responsive to said traveling field.

4. In apparatus of the class described, in combination, two transformers, two primary windings for each of said transformers, one primary winding in each transformer being adapted to be connected to one source of power and the other primary in each transformer being adapted to be connected to the other source of power in such a manner that normally the primary windings of one transformer oppose and the primary windings of the other transformer aid one another, secondary windings for each of said transformers, and means energized from said secondary windings and adapted to produce fluxes substantially in quadrature with the transformer fluxes, the cooperation of said additional fluxes and said transformer fluxes producing fields traveling in one direction when the currents in said sources of power are in phase or out of phase by an acute angle, and traveling in another direction when the currents in said sources of power are out of phase by more than an acute angle.

5. In apparatus of the class described, in combination, two transformers, two primary windings for each of said transformers, one primary winding in each transformer being adapted to be connected to one source of power and the other primary in each transformer being adapted to be connected to the other source of power in such a manner that normally the primary windings of one transformer oppose and the primary windings of the other transformer aid one another, secondary windings for each of said transformers, means energized from said secondary windings and adapted to produce fluxes substantially in quadrature with the transformer fluxes, the cooperation of said additional fluxes and said transformer fluxes producing traveling fields; and a member acted upon by said traveling fields.

6. In apparatus of the class described, in combination, two transformers, two primary windings for each of said transformers, one primary winding in each transformer being adapted to be connected to one source of power and the other primary in each transformer being adapted to be connected to the other source of power in such a manner that normally the primary windings of one transformer oppose and the primary windings of the other transformer aid one another, secondary windings for each of said transformers, means energized from said secondary windings and adapted to produce fluxes substantially in quadrature with the transformer fluxes, the cooperation of said additional fluxes and said transformer fluxes producing traveling fields; and a member acted upon by said traveling fields; the direction of travel of the traveling fields being dependent upon the phase relationship of the currents in said sources.

7. The method of inducing currents in a conductor, which comprises producing first fluxes from sources of power normally acting cumulatively, producing second fluxes from said sources normally acting differentially, producing other fluxes respectively in quadrature with either the first or second fluxes, and causing the several fluxes to combine to form traveling fields inducing currents in said conductor.

8. The method of inducing currents in a conductor, which comprises producing first fluxes from sources of power normally acting cumulatively, producing second fluxes from said sources normally acting differentially, and coacting with the first fluxes, producing other fluxes respectively in quadrature with either the first or second fluxes, and causing the several fluxes to combine to form traveling fields inducing currents in said conductor.

9. The method of producing forces, which comprises producing first fluxes from sources of power normally acting cumulatively, producing second fluxes from said sources normally acting differentially, and coacting with the first fluxes, producing other fluxes respectively in quadrature with either the first or second fluxes, and causing the several fluxes to combine to form traveling fields inducing current in a movable member, the reactions between fluxes caused thereby and the traveling fields tending to move said member.

10. The method of producing forces which comprises producing first fluxes from sources of power normally acting cumulatively, producing second fluxes from said sources normally acting differentially, producing other fluxes respectively in quadrature with either the first or second fluxes, and causing the several fluxes to form one or more traveling fields inducing currents in a movable member, the reactions between fluxes caused thereby and the traveling fields tending to move said member.

11. In an apparatus of the class described, in combination, two induction devices, primary and secondary windings therefor, said primary windings on each induction device adapted to be energized from each of two sources of power, the primaries on one induction device normally aiding, and the primaries on the other induction device normally opposing one another, and means cooperating with said secondary windings for setting up traveling magnetic fields.

In testimony whereof, I have signed my name to this specification this ninth day of May, 1921.

ROLLIN N. CONWELL.